July 27, 1965 G. R. CARLSON 3,197,671

TRANSISTORIZED DEFLECTION SYSTEM

Filed May 21, 1962

Inventor.
George R. Carlson.
By. Hofgren, Brady, Wegner, Allen & Stellman
Attorneys.

United States Patent Office 3,197,671
Patented July 27, 1965

3,197,671
TRANSISTORIZED DEFLECTION SYSTEM

George R. Carlson, Winnetka, Ill., assignor to Warwick Electronics Inc., a corporation of Delaware Filed May 21, 1962, Ser. No. 196,115
6 Claims. (Cl. 315—27)

This invention relates to a deflection system and more specifically to a circuit for controlling the current flow through the deflection coils of a cathode ray tube in a television receiving system.

In modern-day television sets, cathode ray tubes utilizing magnetic deflection systems have practically dominated the field. These cathode ray tubes which produce a beam of electrons that is directed down the neck of the tube have deflection coils located adjacent to the path. As a television picture is developed, it is necessary to sweep the beam from one side of the tube to the other and at the same time to move the beam from the top to the bottom of the tube. A controlled non-uniform increase in magnetic field is desired to produce the sweeps and to this end, the invention is directed.

It is, therefore, an object of this invention to provide a deflection system with an improved linearity of operation.

It is a further object of this invention to produce an improved deflection system in which conservation of energy is practiced.

It is a further object of this invention to utilize energy from corrective control of the deflection system in a manner in which a voltage boost is accomplished.

It is therefore a feature of this invention to provide additional switching means in the deflection circuit for controlling the charge and discharge of a condenser therein.

It is a further feature of this invention to provide a transistorized switch for energizing the primary winding of a transformer during retrace to derive a rectified signal across the secondary winding, thus supplying a voltage usable in another portion of the circuit.

A further feature of this invention provides a transistorized switch for controlling the voltage across a portion of the sweep resonant capacitor.

Yet another feature of this invention is control of the current and voltage supplied to the sweep circuit to effect control of the sweep circuit through conservation of energy.

Further objects and advantages will become apparent from the following detailed description taken in connection with the accompanying drawings in which.

Figure 1:
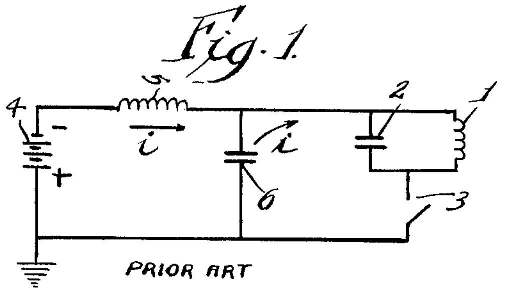
FIGURE 1 is a schematic diagram of a prior art circuit.

While this invention is susceptible of embodiment in many different forms, there is shown in the drawings and will herein be described in detail an embodiment of the invention together with modifications thereof with the understanding that the present disclosure is to be considered as an exemplification of the principles of the invention and is not intended to limit the invention to the embodiment illustrated. The scope of the invention will be pointed out in the appended claims.

In FIGURE 1, the prior art circuitry has a deflection yoke 1 connected in parallel with a capacitor 2. A switch 3 is connected in series with the parallel circuit of inductor 1 and capacitor 2, and the series combination is connected across the series combination of battery 4 and inductor 5. A capacitor 6 is connected across the capacitor 2 and switch 3.

In operation, when switch 3 is open, capacitor 6 is charged by the supply voltage battery 4 through inductance 5. When switch 3 is closed, the elements 6, 2 and 1 form a resonant circuit and a sine wave is developed therein to provide the desired deflection field for uniform scan of wide angle picture tubes.

Figures 4, 5, 6:
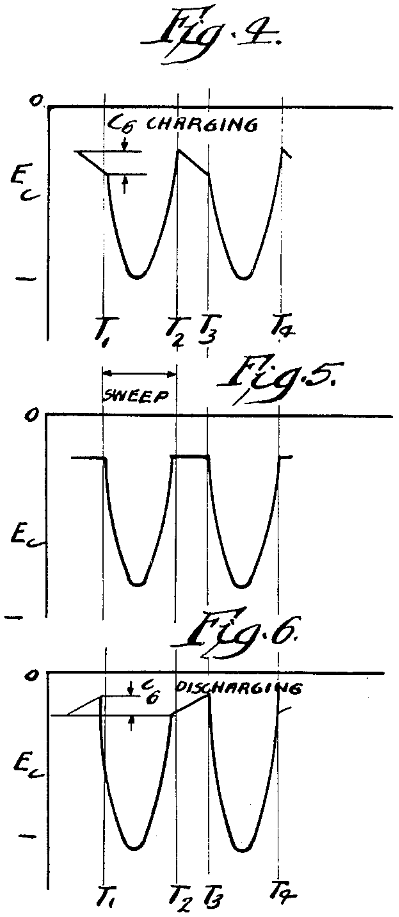
FIGURES 4, 5 and 6 illustrate the operation of the circuits of FIGURES 1, 2 and 3, respectively.

Referring now to FIGURE 4 wherein is shown the voltage characteristics across capacitor 6, a portion of the sine wave appears between the times T1–T2 and times T3–T4, designated in the drawing as "sweep."

Switch 3 opens at times T2 and T4 and capacitor 6 continues to charge through inductance 5. This accounts for the slope of the line designated in FIGURE 4 as "C6 charging" which occurs between times T2 and T3. Actually, the line would not be a straight line but rather would be a slightly curving line due to the charging characteristics of the capacitor and inductance circuit. However, this minor variation may be disregarded for purposes of the present discussion.

It is to be noted that at the time the switch 3 closes, the voltage across capacitor 6 has risen above the voltage in existence at the completion of the sine wave or sweep. The term "above" is used here in the sense that the voltage is more negative or is further from the zero voltage line.

Figure 2:
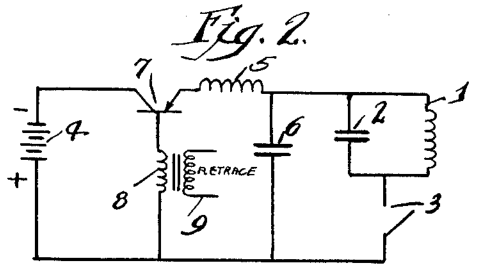
FIGURE 2 is a schematic diagram of an embodiment of the invention.

FIGURE 2, showing one embodiment of the invention, has a switch 7 of the PNP transistor type coupled between inductance 5 and the battery 4. The transistor has base, collector and emitter electrodes and coupled to the base electrode is a transformer 8. The primary winding of transformer 8, designated as 9 in the figure, is coupled to receive pulses during the retrace portion of the sweep signal and transistor 7 is poled to "open" when the switch 3 opens. Thus, no current flows into capacitor 6 during the retrace cycle and as shown in FIGURE 5, the voltage during this period across capacitor 6 does not vary. Thus, a correction has been introduced by control of the energy input to the sweep system.

Figure 3:
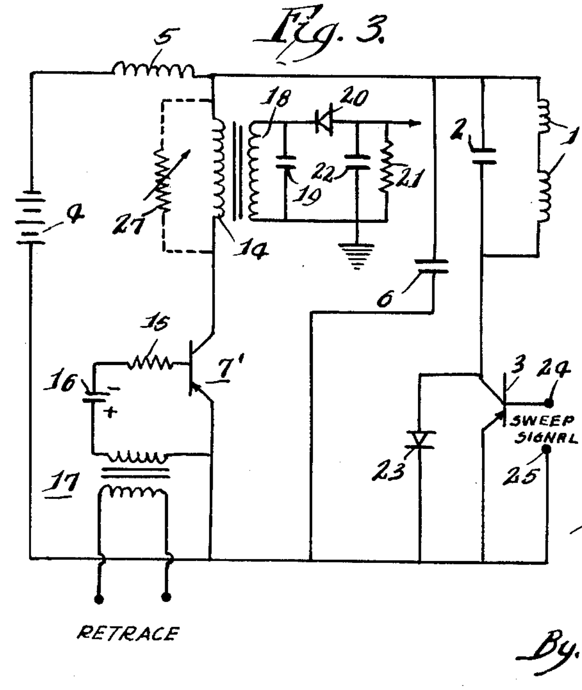
FIGURE 3 is a schematic diagram of a further embodiment of the invention.

In the embodiment of FIGURE 3, switch 7', is connected in series with the primary winding of a transformer 14 across capacitor 6. Again, switch 7' is of the transistor type and in this instance is poled to conduct during the retrace time. A cut-off bias is applied to transistor 7' by a circuit including a resistor 15, a source of direct current potential 16 and the secondary winding of a transformer 17 connected between the base and emitter electrodes of the transistor. It can be seen by the polarities of source 16 that the transistor is normally biased below cut-off. The secondary winding of transformer 18 has a capacitor 19 coupled across it for resonance control. A diode 20 and a resistance 21 form a rectifying circuit along with capacitor 22 which is connected to produce a usable potential. Switch 3 is shown as a PNP transistor having a damping diode 23 connected between its collector and emitter electrodes. Terminals 24 and 25 representing the input from the sweep system are connected with the base and emitter electrodes of transistor switch 3. In addition, there has been provided a variable resistor 27 shown connected in parallel with the primary winding of transformer 14 by dashed lines. If desired, this resistor may be connected in the circuit to control the amount of correction.

In operation, a sweep drive signal connected between terminals 24 and 25 causes switch 3 to close and current to flow through the deflection coil 1. Approximately one-half cycle of a sine wave of voltage is developed as shown in FIGURE 6 between times T1, T2 and times T3, T4. In this embodiment, however, the switch 7' is open during the sweep. During the retrace time, a retrace pulse is applied to the input of transformer 17 and switch 7' is pulsed to an "on" condition. Consequently, capacitor 6 partially discharges through transformer 14 and a voltage pulse is developed across the secondary winding 18 of that transformer. Diode 20 rectifies the pulse and a voltage is developed which is usable in another portion of the circuit. Thus, a conservation of energy has taken place in the embodiment of the invention shown in FIGURE 3.

FIGURE 6 shows the discharging of capacitor 6 during the retrace time and is designated between the arrows marked "C6 discharging."

Figure 7:
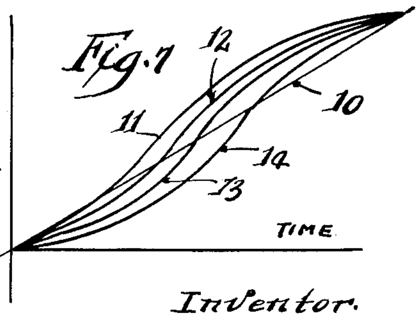
FIGURE 7 is a plot of the current through the deflection yoke for the prior art circuits and embodiments of the invention.

FIGURE 7 shows the curves for the various deflection systems discussed in this application. The straight line marked 10 is the "ideal" current flow through the deflection yoke required for an ideal tube face where the electron beam traverses a spherical surface centered upon the effective origin of the beam. Curve 11 shows the current flow through the yoke without the teachings of this invention. This is the curve that would be shown by an oscilloscope properly coupled to the deflection coil of FIGURE 1. Curve 12 shows the improved current characteristics through the yoke in the circuit of FIGURE 2 and curve 13 shows still further improvement of the current flow through the deflection yoke as discussed with the circuitry of FIGURE 3. The curve 14 shows overcorrection possible by excessive discharge of capacitor 6 of FIGURE 3. These curves have been somewhat exaggerated for the sake of clarity.

I claim:

1. In a display device having a deflectable electron beam and a sweep circuit for developing sweep and retrace control signals, a deflection system comprising: a source of direct current potential; deflection means; first switch means connected in series with said deflection means and connected with said source, and controlled by said signals to conduct during the sweep signal; a capacitor connected in parallel with said deflection means and first switch means, across said source; and second switch means operatively connected with said source and capacitor and controlled by said sweep and retrace signals to control the charge of said capacitor from said source during retrace.

2. In a display device having a deflectable electron beam and a sweep circuit for developing sweep and retrace control signals, a deflection system comprising: a source of direct current potential; deflection means; first transistor switch means connected in series with said deflection means across said source, and having a control electrode connected with said sweep circuit, said switch being controlled by said signals to conduct only during the sweep signal; a capacitor connected in parallel with said deflection means and first transistor switch means, across said source; and second transistor switch means operatively connected with said source and capacitor, and having a control electrode to which is connected the sweep and retrace signals from said sweep circuit, said second switch being controlled by said sweep and retrace signals to prevent charging of said capacitor from said source during retrace.

3. In a display device having a deflectable electron beam and a sweep circuit for developing sweep and retrace control signals, a deflection system comprising: a source of direct current potential; deflection means; first switch means connected in series with said deflection means across said source and controlled by said signals to conduct during the sweep signal; a capacitor connected in parallel with said deflection means and first switch means, across said source; and second switch means connected between said source and the parallel combination of said deflection means and capacitor, and controlled by said signals to conduct during the sweep signal and to be nonconductive during the retrace signal.

4. In a display device having a deflectable electron beam and a sweep circuit for developing sweep and retrace control signals, a deflection system comprising: a source of direct current potential; deflection means; first switch means connected in series with said deflection means across said source and controlled by said signals to conduct during the sweep signal; a capacitor connected in parallel with said deflection means and first switch means, across said source; and a circuit including second switch means connected across said capacitor and controlled by said signals to conduct during the retrace signal and to be nonconductive during the sweep signal.

5. The deflection system of claim 4 wherein means are provided for deriving energy from the circuit of said second switch means during the retrace signal.

6. In a television signal receiver including an image reproducing device having an electron beam deflectable upon its longitudinal axis and a sweep circuit for developing sweep and retrace control signals, a deflection system comprising: deflecting means for positioning said beam, including a first switching device responsive to said sweep signal control signal to close; a source of direct current potential; an inductive reactance device coupled in series with said source; a capacitive reactance device coupled across the series combination of said source and inductive reactance device, said deflecting means being connected across said capacitive reactance device; a transformer having primary and secondary windings; second switching means, normally open, coupled with said primary winding across said capacitive reactance device and responsive to said retrace control signal to close; and a rectifying circuit coupled with said secondary winding for developing a direct current voltage in response to current flow in said primary winding.

References Cited by the Examiner

UNITED STATES PATENTS

| | | | |
|---|---|---|---|
| 2,954,504 | 9/60 | Saudinaitis et al. | 315—27 |
| 2,995,679 | 8/61 | Skoyles | 315—27 X |

OTHER REFERENCES

IRE Dictionary of Electronics Terms and Symbols, Institute of Radio Engineers. New York, 1961, p. 130.

DAVID G. REDINBAUGH, *Primary Examiner.*

ROY LAKE, *Examiner.*